United States Patent
Baker

(10) Patent No.: US 9,218,247 B2
(45) Date of Patent: Dec. 22, 2015

(54) MULTIMASTER SERIAL SINGLE-ENDED SYSTEM FAULT RECOVERY

(71) Applicant: GLOBALFOUNDRIES Inc., Grand Cayman (KY)

(72) Inventor: Anthony E. Baker, Stittsville (CA)

(73) Assignee: GlobalFoundries Inc., Grand Cayman (KY)

( * ) Notice: Subject to any disclaimer, the term of this patent is extended or adjusted under 35 U.S.C. 154(b) by 142 days.

(21) Appl. No.: 13/972,355

(22) Filed: Aug. 21, 2013

(65) Prior Publication Data

US 2015/0058660 A1 Feb. 26, 2015

(51) Int. Cl.
G06F 11/00 (2006.01)
G06F 11/14 (2006.01)

(52) U.S. Cl.
CPC .................. *G06F 11/1415* (2013.01)

(58) Field of Classification Search
CPC .................................................. G06F 11/1415
USPC .................... 714/5.1, 2, 4.5, 43, 44
See application file for complete search history.

(56) References Cited

U.S. PATENT DOCUMENTS

| 7,215,137 | B1 | 5/2007 | Nisbet | |
| 2004/0022107 | A1* | 2/2004 | Zaidi et al. | 365/202 |
| 2005/0120275 | A1 | 6/2005 | Fletcher et al. | |
| 2011/0302351 | A1* | 12/2011 | Aybay et al. | 711/1 |
| 2013/0115803 | A1* | 5/2013 | Tang et al. | 439/488 |

OTHER PUBLICATIONS

Jai Narayan Tripathi et al., "Soft-reconfiguration Management for Operating Systems with Multiprocessor Architecture", 15th International Conference on Advanced Computing and Communications, 2007.
P. Kämmerling et al., "A new readout-controller for COSY-DAQ based on the Virtex-II Pro» System on a Chip« —FPGA", 2005.
Leopold Haller et al., "Relieving Capacity Limits on FPGA-Based SAT-Solvers", FMCAD Inc., 2010.
Jongsok Choi et al., "Impact of Cache Architecture and Interface on Performance and Area of FPGA-Based Processor/Parallel-Accelerator Systems", IEEE 20th International Symposium on Field-Programmable Custom Computing Machines, 2012.

* cited by examiner

*Primary Examiner* — Dieu-Minh Le
(74) *Attorney, Agent, or Firm* — Matthew C. Zehrer

(57) ABSTRACT

A system to recover a multimaster serial single-ended bus and a faulted connected device includes a director device connected to the faulted connected device via the multimaster serial single-ended bus. The director device includes a central processing unit, a field programmable gate array, and a management module in communication with the faulted connected device, the management module configured to recover the faulted connected device and the multimaster serial single-ended bus. The management module may transmit a clock pulse to the faulted connected device if the faulted connected device is holding a data line (SDA) low, transmit a stop command to the faulted connected device if the faulted connected device is holding SDA low and/or read and compare a register value in the faulted device against an expected value to determine if the faulted device and the multimaster serial single-ended bus have been recovered.

17 Claims, 4 Drawing Sheets

MULTIMASTER SERIAL SINGLE-ENDED SYSTEM FAULT RECOVERY

FIELD

Embodiments of invention generally relate to multimaster serial single-ended computer busses, and more particularly to fault recovery of peripheral devices attached to, for example, an I2C director.

DESCRIPTION OF THE RELATED ART

Inter-Integrated Circuit (I2C) is an exemplary multimaster, serial, single-ended, computer bus used for attaching peripherals to a motherboard, embedded system, cellphone, or other electronic device. I2C utilizes two bidirectional open-drain lines, Serial Data Line (SDA) and Serial Clock (SCL), pulled up with resistors.

The I2C reference design has a 7-bit or a 10-bit (depending on the device used) address space. Common I2C bus speeds are the 100 kbit/s standard mode and the 10 kbit/s low-speed mode. Recent enhancements of I2C include the ability to host more nodes, faster bus speeds, and 16-bit addressing. For instance I2C may support 400 kHz or 1 MHz speeds. The maximum number of nodes, or peripherals devices, attached upon the I2C bus may be functionally limited by the available address space or by physical limitations associated with the capacitive load on, and the ability of the I2C to drive, the signal lines.

SUMMARY

Embodiments of invention generally relate to multimaster serial single-ended computer busses, and more particularly to fault recovery of peripheral devices attached to, for example, an I2C director.

In a first embodiment of the present invention, a system to recover a multimaster serial single-ended bus caused by a fault condition on a faulted connected device includes a director device connected to the faulted connected device via the multimaster serial single-ended bus. The director device includes a central processing unit, a field programmable gate array, and a management module in communication with the connected device. The management module is configured to recover the faulted connected device and the multimaster serial single-ended bus.

In another embodiment of the present invention, a method of recovering the multimaster serial single-ended bus and the fault condition on a faulted connected device includes the management module transmitting a SDA recovery signal to the faulted connected device. In certain embodiments, transmitting the SDA recovery signal further includes transmitting a clock pulse to the faulted connected device if the faulted connected device is holding SDA low, transmitting a stop command to the faulted connected device if the faulted connected device is holding SDA low and/or reading and comparing a register value in the faulted device against a known value to determine if the faulted device and the multimaster serial single-ended bus have been recovered.

In yet another embodiment of the present invention, a computer program product for recovering the multimaster serial single-ended bus and the fault condition on a faulted connected device is disclosed. The computer program product includes a computer readable storage medium having program code embodied therewith, the program code executable by the management module to transmit the SDA recovery signal(s) to the faulted connected device.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
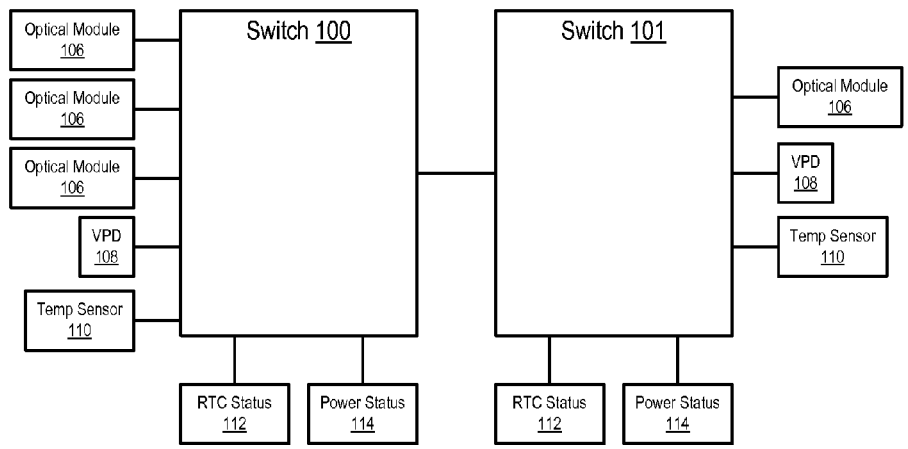
FIG. 1 and FIG. 2 depict numerous devices connected in a multimaster serial single-ended bus topology.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, that depicts numerous devices connected in a I2C topology that includes, for example, a switch 100 integral to a computer system (e.g. top of rack switch, embedded switch, etc.), an external switch 101 (e.g. analog switch, etc.), optical module 106, virtual product data device 108, temperature sensor 110, status devices (e.g. real time data compression status 112, power supply status 114, etc.). The explicit listing of particular devices listed herein is for exemplary purposes.

Figure 2:
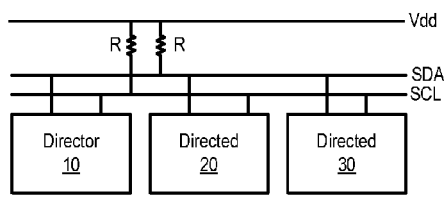

Referring to FIG. 2, the I2C reference dictates a bus with a clock (SCL) and data (SDA) lines with 7-bit addressing. The bus has two roles for nodes: director (e.g. director 10, etc.) and directed (e.g. directed 20, directed 30, etc.). A director node is a node that generates the clock and initiates communication with directed nodes. A directed node receives the clock and responds when addressed by the director. The I2C bus is a multi-master bus. Therefore, any number of director nodes can be present. Additionally, director and directed node roles may be changed between messages (e.g. after a STOP message is sent, etc.).

There are four potential modes of operation for a given bus device, although most devices only use a single role and its two modes: director transmit—director node is sending data to a directed node, director receive—director node is receiving data from a directed node, directed transmit—directed node is sending data to the director, and directed receive—directed node is receiving data from the director. The director is initially in director transmit mode by sending a start bit followed by the 7-bit address of the directed node it wishes to communicate with, which is finally followed by a single bit representing whether it wishes to write(0) to or read(1) from the directed node.

If the directed node exists on the bus then it will respond with an ACK bit (active low for acknowledged) for that address. The director then continues in either transmit or receive mode and the directed node continues in its complementary mode.

The address and the data bytes are sent most significant bit first. The start bit is indicated by a high-to-low transition of SDA with SCL high, the stop bit is indicated by a low-to-high transition of SDA with SCL high. All other transitions of SDA take place with SCL low.

If the director wishes to write to the directed device then it repeatedly sends a byte with the slave sending an ACK bit. If the director wishes to read from the directed node then it repeatedly receives a byte from the directed node, the director sending an ACK bit after every byte but the last one. The director then either ends transmission with a stop bit, or it may send another start bit if it wishes to retain control of the bus for another transfer.

In I2C, both the SCL & SDA lines are of open-drain design and pull-up resistors "R" are needed. Pulling the line to ground is considered "low" while letting the line float is considered "high." An important consequence of this is that multiple nodes may be driving the lines simultaneously. If any node is driving the line low, it will be low. Nodes that are trying to transmit "high" can see this, and thereby know that another node is simultaneously active.

This concept, with regards to directed nodes and SCL, is called "clock stretching" and gives directed nodes a flow control mechanism. When used on SDA, this is called arbitration and ensures there is only one transmitter at a time. When idle, both lines are high. To start a transaction, SDA is pulled low while SCL remains high. Typically, the next step is to pull SCL low.

While SCL is low, the transmitter (initially the director) sets SDA to the desired value and (after a small delay to let the value propagate) lets SCL float high. The director then waits for SCL to actually go high. This will be delayed by the finite rise-time of the SCL signal, and may be additionally delayed by a directed node's clock stretching. Once SCL is high, the director waits a minimum time to ensure the receiver has seen the bit, then pulls it low again. This completes transmission of one bit.

After every 8 data bits in one direction, an "acknowledge" bit is transmitted in the other direction. The transmitter and receiver switch roles for one bit and the receiver transmits a single 0 bit (ACK) back. If the transmitter sees a 1 bit (NACK) instead and if the director transmitting to directed node, it leans that the directed node is unable to accept the data, there is no such directed node, command not understood, or unable to accept any more data. If the transmitter sees a 1 bit (NACK) instead and if the directed node transmitting to the director, it leans that the director wishes the transfer to stop after this data byte.

After the acknowledge bit, the director may do the following: prepare to transfer another byte of data: the transmitter set SDA, and the master pulses SCL high, send a "Stop": Set SDA low, let SCL go high, then let SDA go high releasing the I2C bus, or send a "Repeated start": Set SDA high, let SCL go high, and pull SDA low again. This starts a new I2C bus transaction without releasing the bus.

One of the more significant features of the I2C is clock stretching. An addressed directed node may hold SCL low after receiving (or sending) a byte, indicating that it is not yet ready to process more data. The director that is communicating with the slave may not finish the transmission of the current bit, but must wait until the clock line actually goes high. If the slave is clock stretching, the clock line will still be low. The same is true if a second, slower, director tries to drive the clock at the same time. The director must wait until it observes the clock line going high, and an additional minimum time before pulling the clock low again.

When there are many I2C devices in a system, there can be a need to include bus buffers or multiplexers to split large bus segments into smaller ones. Many types of multiplexers and buffers exist. Multiplexers can be implemented with analog switches which can tie one segment to another. Buffers can be used to isolate capacitance on one segment from another and/or allow I2C to be sent over longer cables or traces. Other types of buffers exist that implement current amplifiers, keep track of the state (i.e. which side drove the bus low), etc.

As the number of I2C devices in a system increase, it is common for a device to have a fault and hang the entire bus. For example if any device holds the SDA or SCL line low it prevents the director from sending START or STOP commands to reset the bus. Thus it is common for designs to include a reset signal that provides an external method of resetting the bus devices. However many devices do not have a dedicated reset pin forcing device recovery by other means. Accordingly, there is a need for improvements of device/bus recovery in an multimaster serial single-ended bus system.

Figure 3:
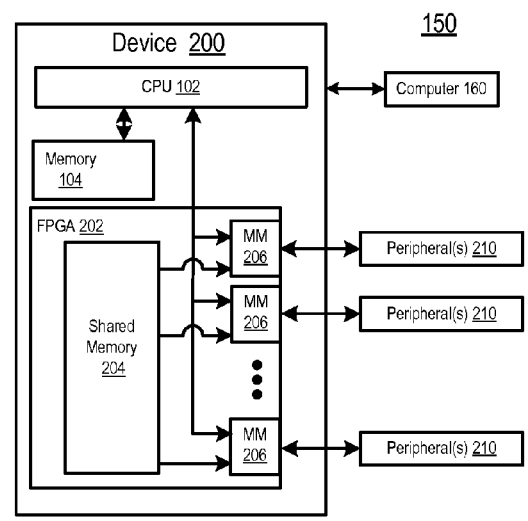
FIG. 3 depicts a device connected to an multimaster serial single-ended bus, according to various embodiments of the present invention.

FIG. 3 depicts a device 200 connected to an multimaster serial single-ended bus (e.g. I2C bus, etc.), according to various embodiments of the present invention. Device 200 is directly attached to one or more peripheral devices 210 via the bus. Peripheral devices 210 may be external from device 200 or integral to device 200 (e.g. CPU, FPGA, sensors, Electrically Erasable Programmable Read-Only Memory, etc.). In a particular embodiment, device 200 is included in a computing environment 150 that includes one or more other computing device 160 (e.g. embedded switch, computer, server, etc.) that is connected to device 200 by a connection topology (e.g. Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, Parallel processor bus, High speed serial bus, etc.). In certain embodiments, device 200 is a director device. For example, FPGA 202 is a director device that may contain one or more management modules 206 that can connect to multiple peripheral devices 210.

A non limiting list of exemplary functions of device 200 include reading configuration data from SPD EEPROMs on SDRAM, DDR SDRAM, DDR2 SDRAM memory sticks (DIMM) and other stacked PC boards, supporting systems management for PCI cards, accessing NVRAM chips, accessing digital to analog converts or analog to digital converts, changing contrast, hue, and color balance settings in monitors, changing sound volume in intelligent speakers, controlling light emitting diode or liquid crystal displays, reading hardware monitors and diagnostic sensors, such as a processor thermocouple, and fan speed, reading real-time clocks, switching the power supply state of system components, etc.

Device 200 includes a central processing unit (CPU) 102 and memory 104. CPU 102 may be any known device that carries out the instructions of a computer program by performing the basic arithmetical, logical, and input/output operations. Device 200 may have more than one CPU 102 (e.g. multiprocessor, multi-core processors, etc.). CPU 102 includes an arithmetic logic unit (ALU), which performs arithmetic and logical operations, and the control unit, which extracts instructions (e.g. software, code, program, etc.) from memory 104 and decodes and executes the instructions, calling on the ALU when required. Memory 104 may be any known storage device that allows for data to be stored and accessed by CPU 102. Memory 104 may be RAM (e.g. SRAM, ROM, OTP, NOR flash, etc.), SRAM, DRAM or other such equivalents used in association with CPU 102.

Device 200 also includes an FPGA 202 (e.g. system on chip, complex programmable logic device, field programmable gate array, etc.). FPGA 202 is an integrated circuit that may be configured after fabrication. As such, FPGA 202 may have numerous logic gates, registers, memory blocks, etc. to implement complex computations, instructions, logic, program code, etc. In certain embodiments, FPGA 202 is the only memory of device 200 (i.e. it serves as memory 104). In other embodiments, FPGA 202 is included within device 200 in addition to another memory 104.

Device 200 also includes a plurality of management modules 206. Generally, management module 206 manages a particular peripheral device 210, or a particular group of peripheral devices 210, connected to device 200. In certain embodiments, management module 206 is a partition of particular logic gates and memory blocks within FPGA 202 dedicated to the particular peripheral device 210, or the particular group of peripheral devices 210. In certain embodiments, management modules 206 and shared memory 204 provide a caching function. Management module 206 queries its peripheral device 210 for information and stores that information in shared memory 204. The CPU 102 may also access the management modules 206 for management module 206 configuration, to access the information in shared memory 204, to act as a director device for accessing to peripheral devices 210 for reads and writes that are not part of management modules 206 caching functions, etc.

Figure 4:
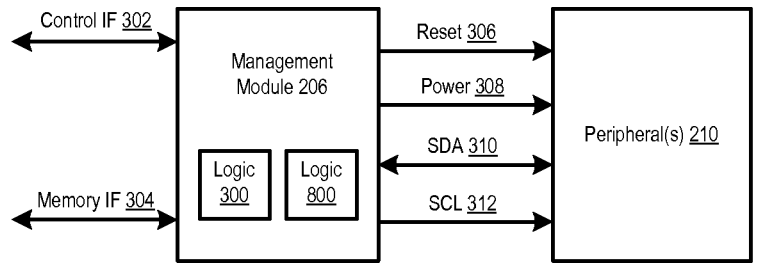
FIG. 4 depicts a exemplary connection scheme between a management module and connected peripheral device(s).

FIG. 4 depicts a exemplary I2C connection scheme between management module 104 and peripheral device(s) 210, according to various embodiments of the present invention. Management module 206 communicates with CPU 102 via control interface 302. Control interface 302 is utilized to transmit control instructions associated with data transfer that occurs between management module 206 and memory 104 via memory interface 304. Control interface 302 and memory interface 304 are used to direct management module 206 in its implementation of, for example, fault recovery logic 300 and prefetch logic 800.

In certain embodiments, device 200 also includes fault recovery logic 300. Generally, fault recovery logic 300 are particular instructions implemented or carried out by at least one management module 206 to direct the manner in which the particular peripheral device 210, or the particular group of peripheral devices 210, shall recover from a fault.

In certain embodiments, device 200 also includes prefetch logic 800. Generally, prefetch logic 800 is a module, instructions, program, etc. implemented or carried out by at least one management module 206 to query its peripheral device 210 for information that is needed, or will be needed, by another device 200 component (e.g. CPU 102, etc.) and to store that information in FPGA 202.

In certain embodiments, management module 206 implements fault recovery logic 300 by it utilizing reset 306, power 308, SDA 310, and SCL 312. Because peripheral devices generally each differ in fault recovery mechanisms there may be instances where various fault recovery techniques are not available. Therefore, management module 206 may implement one or more of the recovery modules of fault recovery logic 300. For example, a particular peripheral device 210 does not have a reset function. Therefore, management module 206 may implement the other fault recovery modules to recover the peripheral device 210.

Management module 206 may transmit a reset signal to peripheral device(s) 210 via reset 306. For example, management module 206 may attempt to reset peripheral device(s) 210 by setting reset 306 high (i.e. the particular state of signal could be switched depending upon the control used, it could be active high, active low, etc.). Further, management module 206 may also transmit data to or accept data from peripheral device(s) 210 via SDA 310. For example, management module may set SDA to a desired value for communication to peripheral device(s) 210. Even further, management module 206 may also transmit a clock signal to peripheral device(s) 210 via SCL 312. For example, management module 206 may pulse the clock by the repetition of a set SCL 312 high/set SCL 312 low cycle. Further, management module 206 may transmit a restart signal to peripheral device(s) 210 via power 308. For example, management module 206 may attempt to cycle the power of peripheral device(s) 210 by setting power 308 high (i.e. the particular state of signal could be switched depending upon the control used, it could be active high, active low, etc.) causing peripheral device(s) 210 to power down and subsequently by setting power 308 low causing peripheral device(s) 210 resume an operating state. Each reset 306, power 308, SDA 310, and SCL 312 may include requisite latches, registers, etc. to successfully transmit and/or receive appropriate state information, data, commands, etc.

Figure 5:
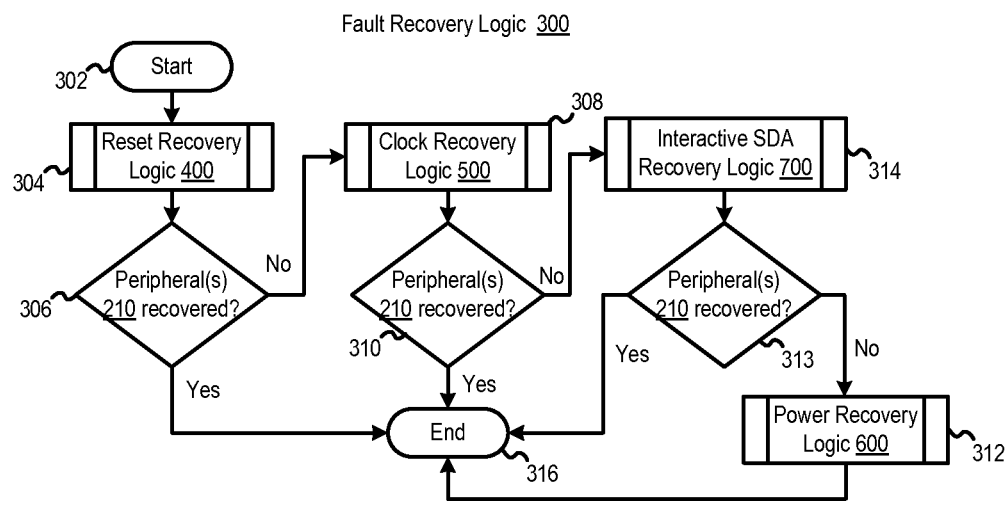
FIG. 5 depicts a flow diagram of fault recovery logic, according to various embodiments of the present invention.

FIG. 5 depicts a fault recovery logic 300 flow diagram, according to various embodiments of the present invention. Management module 206 implements fault recovery logic 300 to recover peripheral device(s) 210 subsequent a fault condition occurring in the directed device. Fault recovery logic 300 starts at block 302 and may continue by implementation of reset recovery logic 400 (block 304). For example, CPU 102 and memory 104 are used to direct management module 206 to carryout reset recovery logic 300. Fault recovery logic 300 determines if peripheral device(s) 210 has recovered from the fault condition (block 306). For example, if the peripheral device(s) 210 has recovered, it may send an "acknowledge" bit to management module 206, may release SDA line from being low, etc. If peripheral device(s) 210 has recovered from the fault condition, fault recovery logic 300 ends at block 316.

If peripheral device(s) 210 has not recovered from the fault condition, fault recovery logic 300 may continue by the implementation of clock recovery logic 500 (block 308). For example, CPU 102 and memory 104 are used to direct management module 206 to carryout clock recovery logic 500. Subsequently, fault recovery logic 300 determines if peripheral device(s) 210 have recovered from the fault condition (block 310). If peripheral device(s) 210 have recovered from the fault condition, fault recovery logic 300 ends at block 316.

If peripheral device(s) 210 have not recovered from the fault condition, fault recovery logic 300 continues by the implementation of SDA recovery logic 700 (block 314). For example, CPU 102 and memory 104 are used to direct management module 206 to carryout SDA recovery logic 700. Subsequently, fault recovery logic 300 determines if peripheral device(s) 210 have recovered from the fault condition (block 313). If peripheral device(s) 210 have recovered from the fault condition, fault recovery logic 300 ends at block 316.

If peripheral device(s) 210 have not recovered from the fault condition, fault recovery logic 300 may continue by the implementation of power recovery logic 600 (block 312). For example, CPU 102 and memory 104 are used to direct management module 206 to carryout power recovery logic 600. Subsequent to the implementation of SDA recovery logic 700, fault recovery logic 300 ends at block 316.

For clarity, the particular order of fault recovery modules within may be different than the order depicted in FIG. 5. For instance, fault recovery logic may implement clock recovery logic 500, SDA recovery logic 700, reset recovery logic 400, and then power recovery logic 600.

Figure 6:
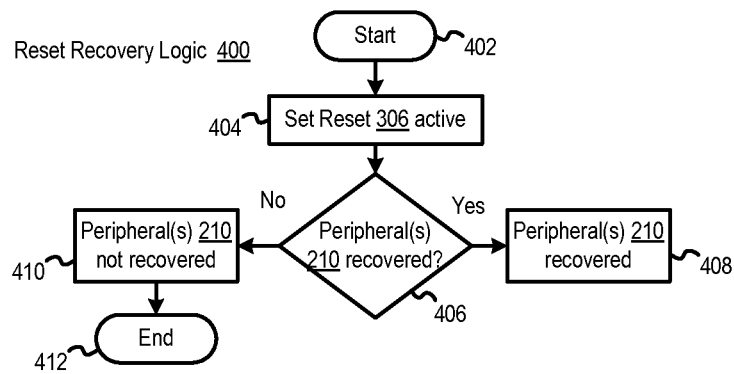
FIG. 6 depicts a flow diagram of reset recovery logic, according to various embodiments of the present invention.

FIG. 6 depicts a flow diagram of reset recovery logic 400, according to various embodiments of the present invention. Reset recovery logic 400 starts at block 402 and continues by management module 206 setting a reset 306 signal active (block 404). If the directed device is equipped with a reset pin, the directed device will then be reset upon receiving the active reset signal. If the directed device is not equipped with a reset pin the directed device will likely not be reset. CPU 102 and memory 104 may be used to direct management module 206 to set reset 306 high so as to be read on the reset pin of the directed device. Reset recovery logic 400 continues by the management module 206 determining whether the peripheral(s) 210 device and/or the bus has been recovered (e.g. the reset was successful, etc.). If the reset was not successful, peripheral(s) 210 device has not been recovered (block 410). If the reset was successful, peripheral(s) 210 device and/or the bus have been recovered (block 408). Reset recovery logic 400 ends at block 412.

Figure 7:
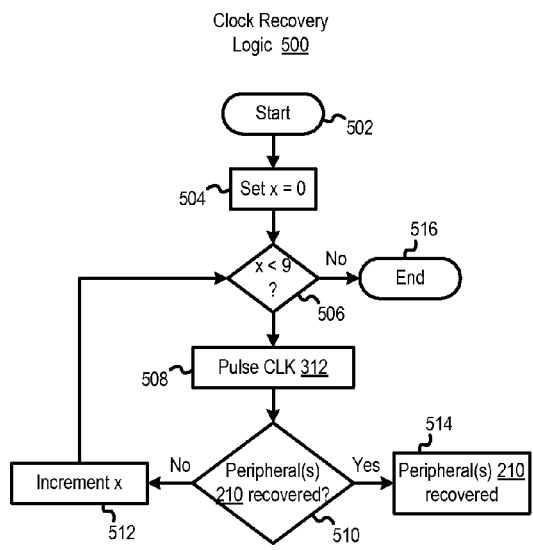
FIG. 7 depicts a flow diagram of clock recovery logic, according to various embodiments of the present invention.

FIG. 7 depicts a flow diagram of clock recovery logic 500, according to various embodiments of the present invention. Clock recovery logic 500 starts at block 502 and continues by management module 206 setting a CLK pulse counter value "x" equal to 0 (block 504). The management module 206 then determines if the CLK pulse counter value "x" is less than 9 (block 506). If the CLK pulse counter value is greater than 9, clock recovery logic 500 ends at block 516. If the CLK pulse counter value is less than 9, management module 206 pulses CLK 312 in an attempt to recovery peripheral(s) 210 and/or the bus (block 508). Management module 206 then determines if peripheral(s) 210 and/or the bus have recovered from the fault condition (block 510). If the fault condition persists, peripheral(s) 210 has not recovered from the fault and memory module 206 increments the CLK counter value "x" (block 512). If the fault condition no longer persists, peripheral(s) 210 and/or the bus have been recovered (block 514).

Figure 8:
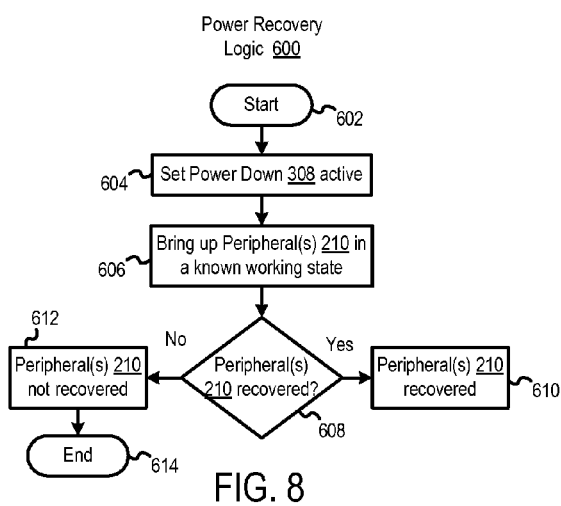
FIG. 8 depicts a flow diagram of power recovery logic, according to various embodiments of the present invention.

FIG. 8 depicts a flow diagram of power recovery logic 600, according to various embodiments of the present invention. Power recovery logic 600 starts at block 602 and continues by the management module 206 cycling the power of peripheral device(s) 210 by, for example, setting power down signal 308 active causing peripheral device(s) 210 to power down (block 604) and subsequently by setting power down signal 308 inactive causing peripheral device(s) 210 resume an operating state (block 606). By cycling the power of the faulted dictated device, management module 206 may successfully recover peripheral(s) 210 and/or the bus. Management module 206 then determines if peripheral(s) 210 and/or the bus have been recovered (block 608). If the fault condition persists, peripheral(s) 210 and/or the bus have not recovered and power recovery logic 600 ends at block 614. If the fault condition no longer persists, peripheral(s) 210 and/or the bus have been recovered (block 610).

Power recovery logic signals may be received by peripheral(s) 210 (e.g. power down pin, FET circuit between Power and the Power pin of the peripheral device(s) 210, etc). The peripheral(s) 210 will normally be on allowing the power to be supplied to the device. In the event of the fault condition, peripheral(s) 210 could be powered down and brought back up in a known good state allowing the SW to continue to run. The control of the power down feature within peripheral(s) 210 and/or within management module 206 may be controlled through registers, latches, etc. within, for example FPGA 202. Other registers and counters can be used by management module 206 to control the length of time that the power down feature within peripheral(s) 210 is toggled. In an alternative embodiment, the CPU 102 may send a direct power down command to peripheral(s) 210, based on a change of state of a power 308 register within the management module 206.

In various embodiments of the present invention, power recovery logic 600 may be the last fault recovery module implemented in fault recovery logic 300. For example, if peripheral device 210 utilizes a volatile memory, the data would within the memory would be lost in the implementation of power recovery logic 600. As such, power recovery logic 600 may be used as a last resort to recover peripheral devices 210.

Figure 9:
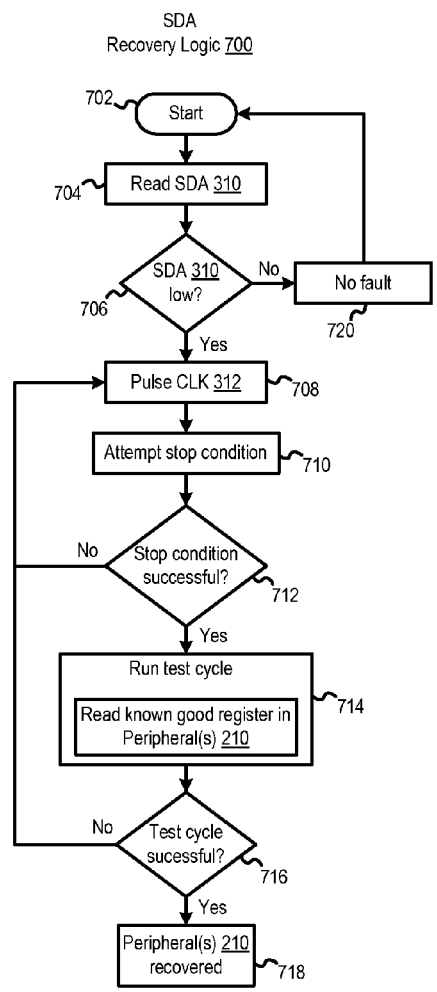
FIG. 9 depicts a flow diagram of SDA recovery logic, according to various embodiments of the present invention.

FIG. 9 depicts a flow diagram of SDA recovery logic 700, according to various embodiments of the present invention. SDA recovery logic 700 starts at block 702 and continues by the management module 206 reading SDA 310 (block 704) and determines whether SDA 310 is low (block 706). Typically, when peripheral(s) 210 is experiencing a fault condition it will hold SDA 310 low (causing a bus fault) generally preventing the director from sending START or STOP commands to reset the bus. As such, if management module 206 determines SDA 310 is high, a fault condition has typically not occurred (block 720).

If management module 206 determines SDA 310 is low it may confirm that a fault condition has occurred and management module 206 with pulse CLK 312 (block 708) and issue a STOP command (block 710) in an attempt to recover peripherals(s) 210 and/or the bus (block 710). The management module 206 subsequently determines if the STOP command was successfully received by peripheral(s) 210 (block 712). If the STOP command was not successfully received by peripheral(s) 210, management module 206 proceeds with another CLK 312 pulse cycle returning to block 708. If the STOP command was successfully received by peripheral(s) 210, management module 206 proceeds with a test cycle (block 714) to ensure that peripheral(s) 210 and/or bus fault condition no longer persists. For example, management module 206 may send an acknowledge bit or it may read a known good register in peripheral(s) 210 to see it the known value is returned from peripheral(s) 210 is as expected. Management module 206 then determines if the test cycle was successful (block 716). If the test cycle was successful, peripheral(s) 210 and/or bus have been recovered. If the test cycle was not successful, management module 206 proceeds with another CLK 312 pulse cycle returning to block 708.

Figure 10:
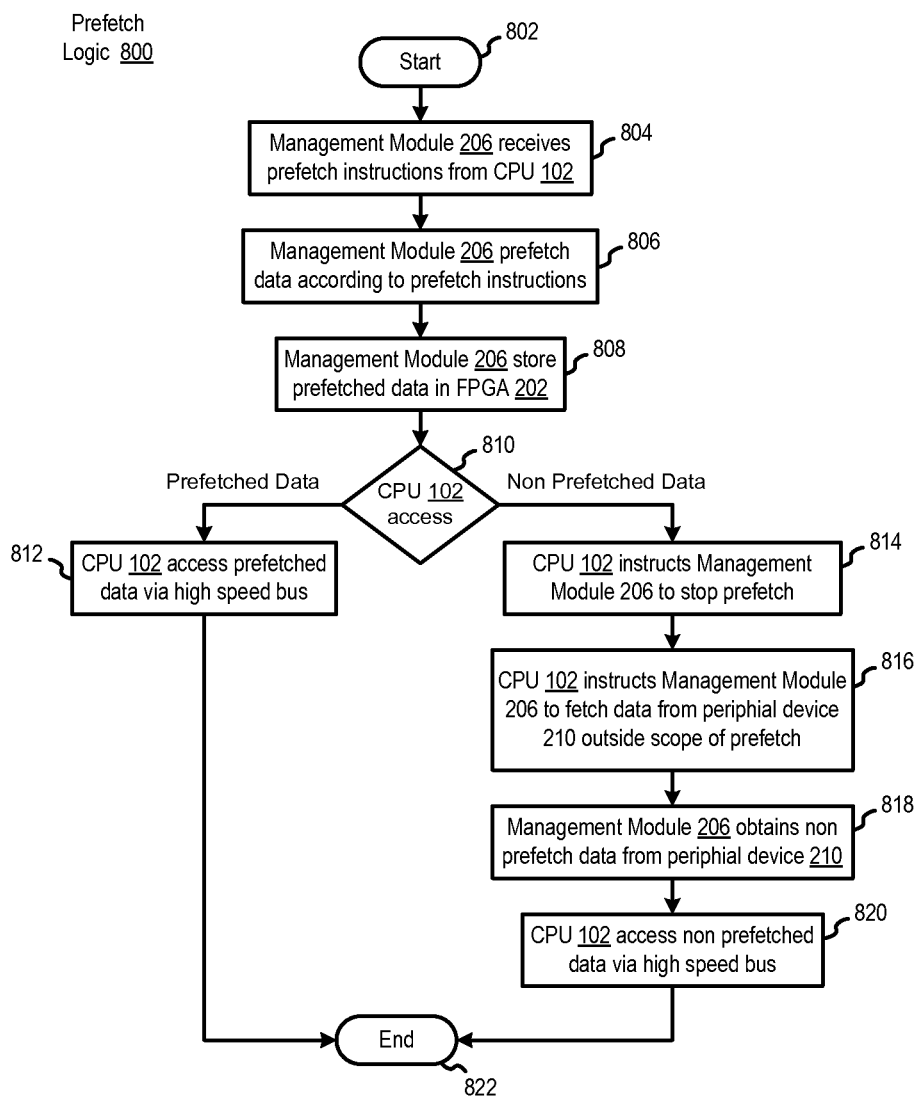
FIG. 10 depicts a flow diagram of prefetch logic, according to various embodiments of the present invention.

FIG. 10 depicts a flow diagram of prefetch logic 800, according to various embodiments of the present invention. Generally, prefetch logic 800 is a module, instructions, program, etc. implemented or carried out by at least one management module 206 to query its peripheral device 210 for information that is needed, or will be needed, by another device 200 component (e.g. CPU 102, etc.) and to store that information in FPGA 202.

Prefetch logic 800 begins at block 802 and continues with management module 206 receiving prefetch instructions from CPU 102 (block 804). Generally, prefetch instructions are the conditions that govern management module in prefetching peripheral device 210 data. For example, prefetch instructions may indicate to management module 206 what information within peripheral device 210 it should prefetch (e.g. regularly accessed information, application specific information, etc.). Prefetch instructions may also indicate to management module 206 when it should access the peripheral device 210 (e.g. continuously, at certain predetermined intervals, upon a triggering event within management module 206, upon a triggering event within peripheral device 210, etc.). Prefetch instructions may be peripheral device 200, computing environment 150, etc. specific. For example, if a large number of similar peripheral devices 200 exists within the computing environment, the prefetch instructions may indicated that a particular management module 202 and peripheral device 210 pair will serve as a master pair whereby, only that pair will execute prefetch logic 800. In certain implementations the master pair could supply its prefetched data to CPU 102, if CPU 102 was attempting to access data associated with a non master peripheral device 210. In other implementations the master pair is not identified and each management module 206 may prefetch data from it's associated peripheral device 210.

Prefetch logic 800 continues with management module 206 prefetching the peripheral device 210 data according to the prefetch instructions (block 806) and storing the prefetched data within FPGA 202 (block 808). For example, a prefetch mechanism within memory module 206 retrieves the desired data according to the prefetch instructions and stores the retrieved data within shared memory 204.

Prefetch logic 800 continues with another device 200 component, such as CPU 102, attempting to access data. It is determined by the other device 200 component and/or management module 206 whether the data to be accessed is prefetched data (block 810). If the data to be accessed has been prefetched, that data is sent from management module 206 to the other component. In certain embodiments, the data is sent from management module to CPU 102 via a high speed parallel bus or other high speed control mechanism (block 812). In this manner the CPU 102 need not communicate to the management module 206 instructing it to go over the, for example, I2C interface and retrieve the desired data.

If the data to be accessed has not been prefetched, the requesting device stops management module 206 from prefetching peripheral device 210 data so that it may retrieve the desired data (block 814). For example, the requesting CPU 102 may instruct the prefetch mechanism to stop retrieving peripheral device 210 data according to the prefetch instructions. The requesting device then instructs management module 206 what data it should retrieve that was not prefetched (block 816). Management module 206 then retrieves the requested data (block 818). For example, the prefetch mechanism within memory module 206 retrieves the desired data according instructions and stores the retrieved data within FPGA 202. In certain embodiments, the requested data is sent from management module 206 to CPU 102 via a high speed parallel bus or other high speed control mechanism (block 820). Prefetch logic 800 ends at block 822.

I2C is the basis for the ACCESS.bus, the VESA Display Data Channel (DDC) interface, the System Management Bus (SMBus), Power Management Bus (PMBus) the Intelligent Platform Management Bus (IPMB), Two Wire Interface (TWI), Two-Wire Serial Interface (TWSI), and therefore, one or more of the embodiments disclosed here are likewise applicable to such multimaster serial single-ended busses.

The drawings are not necessarily to scale. The drawings are merely schematic representations, not intended to portray specific parameters of the invention. The drawings are intended to depict only exemplary embodiments of the invention. In the drawings, like numbering represents like elements.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A system to recover a multimaster serial single-ended bus caused by a fault condition on a faulted connected device, the system comprising:
a director device connected to the faulted connected device via the multimaster serial single-ended bus, the director device comprising:
a central processing unit (CPU) connected to a field programmable gate array (FPGA);
a memory shared by a plurality of management modules, each individual management module associated with a particular connected device, and;
a first management module in communication with the faulted connected device, the first management module configured to recover the faulted connected device and the multimaster serial single-ended bus by at least:
transmitting a clock pulse upon an Inter-Integrated Circuit (I2C) bus Serial Clock Line (SCL) to the faulted connected device;
if the transmitted clock pulse does not recover the faulted connected device and the multimaster serial single-ended bus, transmitting an I2C stop signal utilizing the SCL and an I2C Serial Data Line (SDA) to the faulted connected device, and;
reading and comparing a register value in the faulted device against a known value to determine if the faulted device and the multimaster serial single-ended bus have been recovered.

2. The system of claim 1 wherein the first management module is in communication with a reset pin of the faulted connected device via at least a reset signal.

3. The system of claim 1 wherein the first management module is in communication with the faulted connected device via at least a power signal to power down and restart the faulted connected device.

4. The system of claim 1 wherein the first management module is further configured to recover the faulted connected device by implementing fault recovery logic stored in the FPGA.

5. The system of claim 4 wherein the fault recovery logic comprises:
faulted connected device reset logic, director device clock pulse logic, faulted connected device power cycle logic, and SDA recovery logic.

6. The system of claim 1 wherein the director device is connected with a plurality of connected devices, and wherein each connected device is connected with an individual management module.

7. The system of claim 1 wherein transmitting the I2C stop signal further comprises:
setting SDA low with the management module;
allowing SCL to go high with the management module, and;
allowing SDA to go high, with the management module, releasing the I2C bus.

8. A method of recovering a multimaster serial single-ended bus and a fault condition on a faulted connected device, the method comprising:
recovering, with a management module comprised within an field programmable gate array (FPGA), the faulted connected device by the management module at least:
transmitting a clock pulse upon an Inter-Integrated Circuit (I2C) bus Serial Clock Line (SCL) to the faulted connected device;
if the transmitted clock pulse does not recover the faulted connected device and the multimaster serial single-ended bus, transmitting an I2C stop signal utilizing the SCL and an I2C Serial Data Line (SDA) to the faulted connected device, and;

reading and comparing a register value in the faulted device against a known value to determine if the faulted device and the multimaster serial single-ended bus have been recovered.

9. The method of claim 8 wherein the faulted connected device is recovered by the management module further:

transmitting a power cycle signal to the faulted connected device to power down and restart the faulted connected device.

10. The method of claim 8 wherein the faulted connected device is recovered by the management module further:

transmitting a reset signal to a reset pin of the faulted connected device.

11. The method of claim 8 wherein transmitting the I2C stop signal further comprises:

setting SDA low with the management module;

allowing SCL to go high with the management module, and;

allowing SDA to go high, with the management module, releasing the I2C bus.

12. The method of claim 8 wherein the FPGA further comprises a memory shared by a plurality of management modules, each individual management module connected with a particular connected device.

13. A computer program product for recovering a multimaster serial single-ended bus and a fault condition on a faulted connected device, the computer program product comprising a non-transitory computer readable storage medium having program code embodied therewith, the program code executable by a management module comprised within an field programmable gate array (FPGA) to:

recover the faulted connected device by the management module at least:

transmiting a clock pulse upon an Inter-Integrated Circuit (I2C) bus Serial Clock Line (SCL) to the faulted connected device;

if the transmitted clock pulse does not recover the faulted device and the multimaster serial single-ended bus, transmitting an I2C stop signal utilizing the SCL and an I2C Serial Data Line (SDA) to the faulted connected device, and;

reading and comparing a register value in the faulted device against a known value to determine if the faulted device and the multimaster serial single-ended bus have been recovered.

14. The computer program product of claim 13 wherein the faulted connected device is recovered by the management module further:

transmitting a power cycle signal to the faulted connected device to power down and restart the faulted connected device.

15. The computer program product of claim 13 wherein the faulted connected device is recovered by the management module further:

transmitting a reset signal to a reset pin of the faulted connected device.

16. The computer program product of claim 13 wherein transmitting the I2C stop signal further comprises:

setting SDA low with the management module;

allowing SCL to go high with the management module, and;

allowing SDA to go high, with the management module, releasing the I2C bus.

17. The computer program product of claim 13 wherein the FPGA further comprises a memory shared by a plurality of management modules, each individual management module connected with a particular connected device.

* * * * *